Patented Dec. 15, 1931

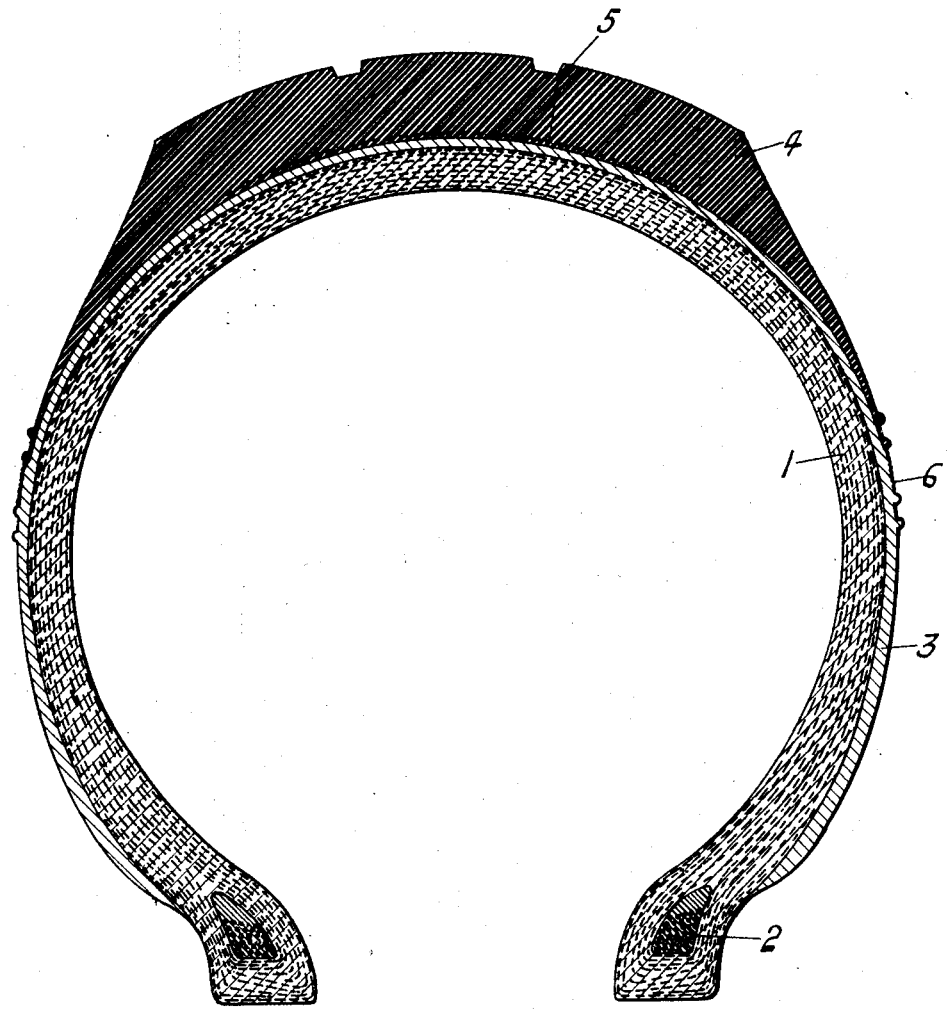

1,836,468

UNITED STATES PATENT OFFICE

DEWITT T. HICKS, OF WACO, TEXAS, AND VERNON L. SMITHERS, OF AKRON, OHIO

TIRE CONSTRUCTION

Application filed September 9, 1929. Serial No. 391,116.

The present invention relates to the construction of pneumatic tires and to the securing of certain advantages and benefits as will be more fully set forth.

The object of the invention is to construct a new and improved tire which, by the selection and arrangement of the several elements thereof obtains results which add to the life and efficiency of the tire structure. The invention utilizes certain properties of well known rubber compounds in such a manner that desirable cooling of the structure is obtained.

In the driving of a car at high speed, or in certain localities or under certain road and temperature conditions, the tires will generate considerable heat, which is detrimental to the tire structure. This heat is generated in two ways, first, by the frictional or abrasive contact between the tire and the road, and, second, by the contortions, convulsions and flexing of the carcass of the tire. In the standard tire constructions the heat is not carried off except by the surface contact of the air and the tire. The usual compositions now used for treads and often for sidewalls contain large proportions of carbon black which give rubber certain desirable properties, including heat insulating characteristics and resistance to abrasion. These characteristics will prevent to some extent the frictional or abrasive heat generated between the tire and the road from being carried up into the carcass of the tire. However, these very heat insulating characteristics will cause a larger percentage of the second type of heat which is generated within the tire carcass to be retained or confined therein. And as it is the tire fabric which is most adversely affected by the heat, harmful results to the tire often follow. Other compounds, such, for example, as those compounds of zinc, usually in the form of zinc oxid or similar compounding ingredients, are high in specific gravity and have been found to be much better conductors of heat, although they may have less abrasion resisting properties than the carbon black compounds.

It is the purpose of the present invention to utilize the desirable properties of these two types of compounds to secure rapid and effective cooling of the tire in service without sacrificing the wearing qualities. The zinc compounded rubber is so located as to conduct the heat away from the portion of the tire lying under the tread and dissipate it through the sidewalls where the tire is exposed to the air.

It will be understood that while the construction of the tire is given in considerable detail, the invention is not limited to the exact construction shown, nor to the described compounds, as changes and modifications may be made, which secure the advantages and benefits claimed, which are within the scope of the invention as set forth in the appended claims.

The single view in the drawing shows a cross-section of the improved tire construction.

In this drawing the carcass of the tire is indicated at 1, being comprised of the usual plies of fabric. This is preferably comprised of layers of rubberized cord and is in accordance with the present standard practice, but may be varied as found desirable. The beads are indicated at 2.

About the outer surface of the tire is the layer of rubber indicated by the numeral 3 which covers the whole of the carcass from bead to bead, constituting the sidewalls and extending under the tread. This layer of rubber is compounded with suitable fillers and pigments, such as zinc oxide, which combines with the rubber to make a vulcanized cover or sheath having high heat conductivity.

The tread is indicated by the numeral 4 and is comprised of rubber compounded with lamp black, carbon black, or similar filler and pigment which give heat insulating characteristics and wear resisting properties to the rubber.

It will be seen that by the judicious combination of these two forms of rubber compounds and by the arrangement thereof, the heat which is generated at the tread of the tire is in a large measure insulated from the carcass by the heat insulating characteristics of the tread 4, but such heat as reaches the carcass or is generated therein beneath the tread is absorbed by the intermediate layer of rubber 3 of high heat conductivity, which conducts the heat along the body thereof to the sidewalls where it is exposed to the air and where the heat will be radiated and dissipated. The homogeneous integral sheath or covering of the high conductivity rubber extending under the tread and over the sidewalls where it is exposed serves as a protection to the carcass in that it dissipates the heat set up therein, due to the flexing and contortions of the tire. It also cools the tread portion of the tire underneath or within the structure of the tire, as well as that portion of the carcass immediately beneath the sidewalls.

The breaker strip is illustrated at 5 and may be located above or below the layer 3. No cushion layer of rubber has been shown, as this may be omitted, or it may be placed beneath the tread if desired. The tread extends to points on the sidewalls of the tire, the extent thereof being determined by the manufacturer. As shown herein, it extends to an intermediate layer or stripe 6 which may be painted or coated as is frequent in the art, the stripe serving to conceal the line of division between the tread and the sidewall.

It will be appreciated that the objects and purposes are very beneficial in tire constructions and particularly where, due to service, road conditions or temperature, tires become highly heated with detrimental effects upon the life thereof.

What is claimed is:

1. In a pneumatic tire construction, a carcass, a tread thereon, and a separate layer of rubber of relatively high thermal conductivity compared to the rest of the tire surrounding the carcass, lying between the carcass and the tread and exposed upon the side of the tire.

2. In a pneumatic tire construction, a carcass, a tread about the outer surface thereof composed of rubber of relatively high abrasive resisting properties but relatively low heat conductivity compared to the rest of the tire, and a layer of rubber of high heat conductivity as compared to the tread and carcass, having a portion thereof extending beneath the tread and a portion thereof exposed at the side of the tire.

3. In a pneumatic tire construction, a carcass, a tread about the outer surface thereof composed of rubber of high abrasive resisting properties but low heat conductivity compared to the rest of the tire, and a layer of rubber of high heat conductivity compared to the tread and carcass surrounding the carcass of the tire so as to be interposed between the tread and the carcass and exposed on the side of the tire.

4. In a pneumatic tire construction, a carcass, a tread about the outer surface thereof composed of rubber compounded with a carbon black to improve its heat insulating and abrasion resisting properties, and a layer of rubber exposed at the side of the tire and extending beneath the tread, the layer containing a zinc compound for imparting thereto thermal conductivity greater than that of the tread.

DEWITT T. HICKS.
VERNON L. SMITHERS.